Nov. 1, 1966  E. A. FRECHETTE  3,282,438
SLICED FOOD SERVING RACK
Filed Nov. 30, 1964
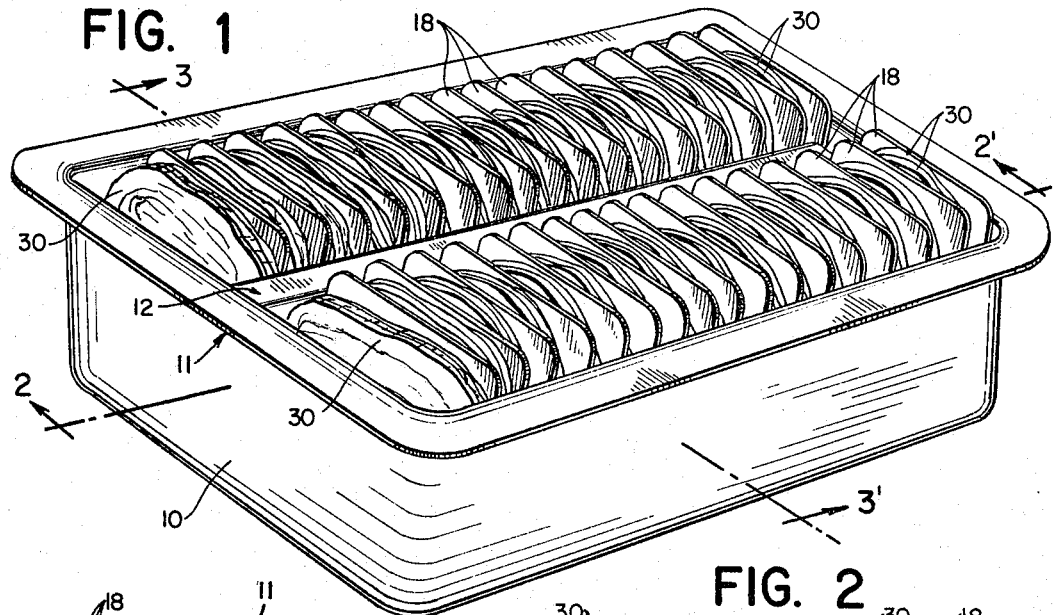
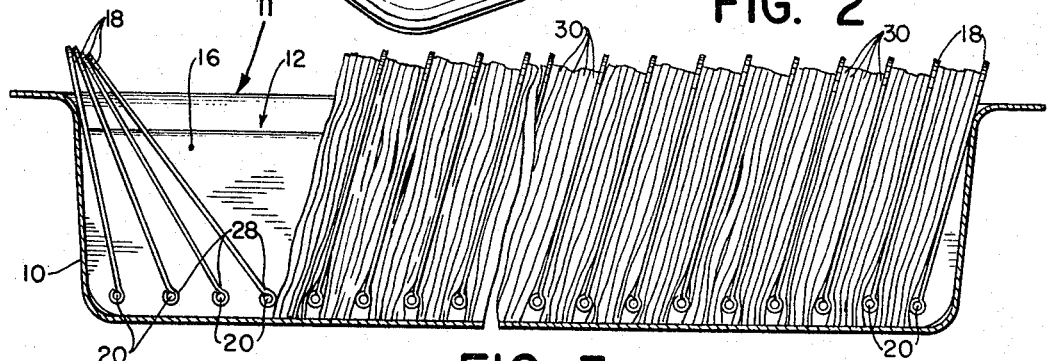
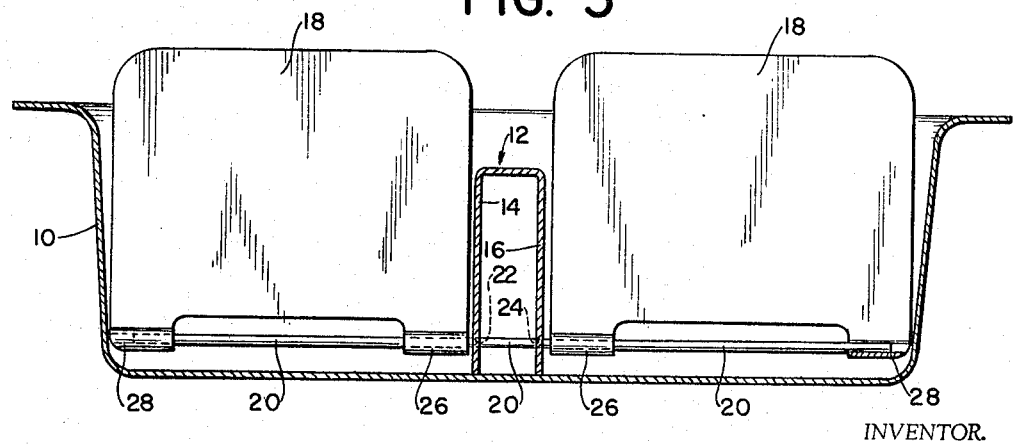
INVENTOR.
ERNEST A. FRECHETTE

United States Patent Office 3,282,438
Patented Nov. 1, 1966

3,282,438
SLICED FOOD SERVING RACK
Ernest A. Frechette, 365 Winnepoge Drive,
Fairfield, Conn.
Filed Nov. 30, 1964, Ser. No. 414,530
4 Claims. (Cl. 211—49)

The subject matter provided by my invention is a serving rack which is particularly suitable for facilitating the serving of an equal number of foodstuff slices (e.g., thin slices of roast beef, ham, cheese, or similar foodstuffs) to a great number of persons, such as a line of cafeteria patrons who are individually served the sliced food as they pass one-by-one a designated serving point in a line in the cafeteria. The subject serving rack may serve to keep the sliced food hot while it is in the rack. If desired, the sliced food may be kept chilled while it is in the subject rack; e.g., so called cold cut meat, such as ham, salami, bologna, or the like, may be kept in a chilled state before they are used in the preparation of sandwiches.

Thus, one object of my invention is to make it easier to serve an equal number of food slices, more rapidly, to greater numbers of people awaiting service because I have observed that with the presently known serving equipment and methods of service too much time and effort is expended in serving each patron, or customer, and even with such an expenditure of time and effort (i.e., the tedious work required on the part of each server) each customer does not as a rule receive an equal number of food slices; especially very thinly sliced roast beef, ham, bologna, cheese, or the like. For example, thinly sliced roast beef, or the like, is presently transferred for serving into a hot pan in a steam table. The roast beef slices are usually dumped into the hot pan in the steam table and these slices are somewhat tangled, rather than neatly stacked or otherwise regularly arranged. In addition, the slices adhere to each other so that two or more slices, which appear to the server to be one slice, are picked up and mistakenly served as one slice. Even if the slices are regularly arranged or stacked in the hot pan, two or more adhering slices which are very thin would appear as but one slice and be served as such. Also, when the slices are in a somewhat tangled arrangement in the hot pan, the person serving must, with the aid of a fork at least, separate what is apparently a predetermined number of slices and, then, put them on a customer's plate. Such a serving technique is both tedious and, necessarily, time consuming.

Another object of my invention is to maintain the food slices in a hot, or chilled, condition while they are in the subject rack.

Another object of my invention is to provide a sliced food serving rack which is so constructed that it can be thoroughly cleansed and sanitized after use so that no food particles, grease, or the like will adhere to or otherwise get caught in the rack.

Another object of my invention is to substantially increase the sliced food storage capacity of the serving pan, thereby reducing the number of times it has to be refilled during food service periods.

Another object of my invention is to prevent the discoloration of the sliced food (e.g., hot meat slices) which, without being covered by the trays of my serving rack, would when exposed to air discolor, lose eye appeal, and not be chosen by the customer.

Another object of my invention is to substantially reduce the amount of airborne bacteria and dust which can come into contact with the sliced food, which food could without being protected by the trays of my serving rack be subjected to substantial amounts of bacteria and dust in certain environments.

Another object of my invention is to provide a sliced food serving rack which facilitates the inventorying of sliced food.

In accordance with one illustrative embodiment of my invention I provide a rack which is intended to be inserted within a serving pan after the rack has been filled or loaded with sliced food. However, the rack may be used without inserting it within the pan. The rack itself is comprised of a plurality of hinged wall members or trays arranged in side by side relationship and spaced apart from each other. Being hinged the wall members can be rotatively moved through a limited length of arc so that at the opposite extremes of the arcuate swing the adjacent wall members can overlap each other. At a point between the aforementioned extremes, the adjacent wall members will assume parallel vertical positions. Thus, the plurality of hinged wall members or trays, when no food slices are inserted between them, suggest the appearance of a venetian blind and when the wall members are rotated they act like the slats of a venetian blind. After a predetermined equal number of food slices have been inserted between each pair of adjacent wall members, the filled rack may then be placed in the serving pan. If, for example, the food slices are roast beef and it is desired that these slices be served hot, both the rack and the serving pan should be preheated before the roast beef slices are inserted into the spaces between the rack's wall members. Since the rack and pan have been preheated, the food slices contained therein will remain hot for a considerable length of time while the slices are being served. When the food filled rack is in the pan the wall members or trays and the sliced food therebetween will assume an angular position; e.g., the wall members and food slices will be inclined in a direction toward the forward end of the pan. As the customers pass by the forward end of the pan, the server need only rotate each wall member from the forward end of the pan, backwardly, toward the rear end of the pan in the direction toward the server. As a result, one portion comprising an equal number of food slices will be exposed and, thus, each passing customer will be served the same number of food slices. The portions will not differ among customers.

Other objects as well as the many features and advantages of my invention will appear from the following detailed description of the invention as well as the drawings which accompany the description.

In the drawings:

FIG. 1 is a perspective view showing a serving rack according to my invention filled with food slices and resting within a serving pan;

FIG. 2 is a longitudinal section viewed along section line 2–2' in FIG. 1;

FIG. 3 is a sectional view viewed along the section line 3–3' in FIG. 1.

In the drawings there is shown a preheated serving pan 10 which is assumed to be supported and continuously heated in a steam table (not shown) of the kind commonly seen in cafeterias. Situated within pan 10 is the serving rack according to my invention. The serving rack 11 is comprised of: the longitudinal channel member 12, including a pair of downturned legs 14 and 16; a plurality of spaced apart wall members 18—18 or trays; and a plurality of horizontally arranged rods 20—20 which are supported by the legs of channel member 12 and serve as pivots about which the wall members 18 can be rotatively moved.

The legs 14 and 16 of the channel member 12 are provided with a plurality of aligned holes 22 and 24, respectively. This alignment of hole pairs 22 and 24 extends for a substantial distance, longitudinally, along the legs 14 and 16. As shown at FIG. 3 every rod 20 protrudes through a pair of holes 22 and 24 and extends beyond the legs 14 and 16 for a substantial distance.

In FIG. 3 the construction of the wall members 18 is clearly shown. At the bottom edge of each wall member 18 there are formed two extending tabs at opposite sides of the wall member. These tab members are turned with a tool suitable for the purpose into two short hollow cylindrical members 26 and 28. See FIGS. 2 and 3. Since the rods 20 extend into these members 26 and 28 there is defined the hinges for rotating the wall members.

The space between adjacent wall members 18 is filled with an equal number of food slices 30—30. Thus, each space contains an equal portion of food to be served.

The pan as well as all of the parts comprising the rack may be made of a noncorrosive material with good heat conductive properties, such as stainless steel or the like. Stainless still, or the equivalent, is especially advantageous in that it can be cleansed and sanitized readily. Stainless steel is widely used for kitchen equipment because of the aforementioned qualities as well as others.

FIG. 2 shows how the food-filled rack in the pan may be used to dispense the food slices. In the orientation shown at FIG. 2 the food server stands to the left, or rear side, and the passing customer stands at the right-hand side of the pan. To serve each customer, the food server need only rotate toward himself the wall members 18, one-at-a-time; the equal number of food slices 30 being exposed and served to the customer.

One important feature of my invention resides in the way in which the rack is assembled and easily taken apart. After the food slices have been served and the rack is empty, the rack is removed from the pan 10. Then the wall members 18—18 are slidably removed from the rods 20—20. Afterwards the rods 20—20 can be withdrawn from the holes in the legs of the channel member 12. Then, channel member 12, the rods 20—20 and the wall members 18—18 can be cleaned in their disassembled condition. A better cleaning and sanitizing of the individual parts will be enabled as contrasted to cleaning the assembled rack. About the only places that food particles and grease, or the like, will tend to lodge will be inside the cylinders 26 and 28. But, since these cylinders 26 and 28 are relatively short and because the rods 20 are removed therefrom the inside of these cylinders and the outer portion of the rods normally situated therein can be cleansed and sanitized more thoroughly.

Another feature of my invention is that a more accurate inventorying of the food can be achieved. Since each space between the wall members 18 is filled with an equal portion comprising an equal number of slices, it is but a simple matter of arithmetic to determine the amount of food sold—even the number of portions, or customers, preferring a certain food.

While there has been described an illustrated but one embodiment of the invention it is to be understood that such description and illustration is not to be taken as limitive of my invention. Rather the scope of my invention is to be determined from the following claims.

What is claimed is:

1. A sliced food serving rack adapted for insertion within a pan, said serving rack comprising: a longitudinal channel member having a pair of spaced-apart substantially vertical legs, each leg having a plurality of evenly spaced holes extending in a straight-line series in a longitudinal direction along the leg for a substantial distance, each hole in one leg being in alignment with a corresponding hole in the other leg; a plurality of longitudinal rods, each rod slidably extending through a pair of aligned holes, all of the rods being substantially perpendicular relative to the longitudinal channel member, each rod being so arranged that substantially equal lengths of the rod extend outwardly from both legs; a plurality of wall members, there being twice as many wall members as there are rods, each wall member having at least one tab member integral therewith and projecting from the bottom edge of the wall member, each tab member of each wall member being formed into a hollow cylinder-like member, each rod supporting one pair of wall members by extending through each hollow cylinder-like member of each pair of wall members whereby each wall member is independently pivotable about said rod and slidably detachable from each rod, the length of each rod being very much greater than the axial length of each hollow cylinder-like member through which the rod extends, each rod pivotally supporting one wall member of the pair of wall members on that length of the rod which extends outwardly from one side of the channel member and also pivotally supporting the other wall member of said pair of wall members on that length of the same rod which extends outwardly from the opposite side of the channel member, the adjacent wall members supported on adjacent rods on the same side of the channel member being spaced apart, when vertically disposed, by approximately the same distance as the distance between adjacent holes in the same leg of the channel member.

2. A serving rack adapted for insertion in a pan, said rack comprising: an elongated member adapted for being rested on the floor surface of a pan, said elongated member having a plurality of evenly spaced holes passing crosswise through said elongated member and extending serially along the length of said elongated member; a plurality of rods, each rod extending through a different hole in said elongated member in such a way as to be detachable from said elongated member and arranged so that the elongated member defines two sections of the rod, one section extending outwardly from one side of the elongated member and the other section extending outwardly from the opposite side of the elongated member; and a plurality of wall members, each wall member being pivotable about a section of the rod so that each rod pivotably support two wall members, one wall members being supported on one section of the rod and the other wall member being supported on the other section of the same rod, each wall member being detachable from the section of the rod about which the wall member is pivoted.

3. A serving rack comprising: an elongated member having a plurality of holes passing crosswise through said elongated member and extending lengthwise along said elongated member; a plurality of rods, each rod extending through a different one of said holes whereby said elongated member supports each rod and separates each rod into two sections such that one section extends outwardly beyond one side of the elongated member and the other section extends outwardly beyond the opposite side of the elongated member; and a plurality of pairs of wall members, each pair of wall members being supported on a different one of said rods such that one of the wall members is pivoted on said one section of the rod and the other of the wall members is pivoted on said other section of the rod.

4. In combination, a pan including a floor surface and a sliced food serving rack located in said pan, said rack comprising an elongated member freely lying on said floor surface and having a plurality of holes passing crosswise therethrough and extending lengthwise therealong, a plurality of rods, each rod extending into a different hole and protruding therefrom so as to extend crosswise of said elongated member, each rod being removable from its hole in said elongated member, and a plurality of wall members, each wall member being pivoted at a bottom portion thereof to a different rod for rotation about the rod, said wall members being removable from their respective rods, said rack being removable from said pan by lifting it upwardly therefrom.

References Cited by the Examiner

UNITED STATES PATENTS

| 1,119,925 | 12/1914 | Chatham | 129—16 |
| 1,440,491 | 1/1923 | Proudfit | 211—11 |
| 1,521,470 | 12/1924 | Pearl | 129—43 |
| 1,625,711 | 4/1927 | Cox | 129—16 |
| 2,294,194 | 8/1942 | Metzger | 211—11 |

CLAUDE A. LE ROY, *Primary Examiner.*

CHANCELLOR E. HARRIS, *Examiner.*

W. D. LOULAN, *Assistant Examiner.*